(12) United States Patent
Lee

(10) Patent No.: US 11,233,472 B2
(45) Date of Patent: Jan. 25, 2022

(54) MOTOR CONTROL METHOD AND SYSTEM

(71) Applicants: Hyundai Motor Company, Seoul (KR); Kia Motors Corporation, Seoul (KR)

(72) Inventor: Dong Hun Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 172 days.

(21) Appl. No.: 16/003,355

(22) Filed: Jun. 8, 2018

(65) Prior Publication Data

US 2019/0190416 A1 Jun. 20, 2019

(30) Foreign Application Priority Data

Dec. 20, 2017 (KR) .................. 10-2017-0175647

(51) Int. Cl.
| | |
|---|---|
| *H02P 6/12* | (2006.01) |
| *H02P 6/28* | (2016.01) |
| *G01L 3/00* | (2006.01) |
| *G01D 5/14* | (2006.01) |
| *H02P 6/16* | (2016.01) |
| *F16H 59/00* | (2006.01) |

(52) U.S. Cl.
CPC .............. *H02P 6/28* (2016.02); *F16H 59/00* (2013.01); *G01D 5/145* (2013.01); *G01L 3/00* (2013.01); *H02P 6/16* (2013.01)

(58) Field of Classification Search
CPC ........... F16H 59/00; G01D 5/145; G01L 3/00; H02P 21/18; H02P 6/16; H02P 6/17; H02P 6/28

USPC ...................................................... 318/400.15
See application file for complete search history.

(56) References Cited

U.S. PATENT DOCUMENTS

| | | | | |
|---|---|---|---|---|
| 2005/0240321 A1* | 10/2005 | Darke | ................... | B60T 8/1703 701/3 |
| 2009/0218969 A1* | 9/2009 | Sato | .......................... | H02P 1/16 318/400.04 |
| 2011/0316458 A1* | 12/2011 | Yanagita | .................. | H02P 21/06 318/400.02 |
| 2012/0235610 A1* | 9/2012 | Hisano | ....................... | H02P 6/16 318/400.04 |
| 2014/0225546 A1* | 8/2014 | Sato | .......................... | H02P 6/10 318/400.26 |
| 2016/0056692 A1* | 2/2016 | Suzuki | .................. | H02K 29/08 310/68 B |

(Continued)

FOREIGN PATENT DOCUMENTS

| | | |
|---|---|---|
| KR | 20000074672 A | 12/2000 |
| KR | 10-2016-0036210 A | 4/2016 |
| KR | 10-1755831 B1 | 7/2017 |

*Primary Examiner* — Kawing Chan
*Assistant Examiner* — Gabriel Agared
(74) *Attorney, Agent, or Firm* — Mintz Levin Cohn Ferris Glovsky and Popeo, P.C.; Peter F. Corless

(57) ABSTRACT

A motor control method and system are provided. The method includes calculating a measured value of a revolution per minute (RPM) of a motor based on a signal measured by a hall sensor installed in the motor and applying a motor system load model to calculate a predicted value of the RPM of the motor. Further, noise of a hall sensor signal is detected using the measured value of the RPM of the motor and the predicted value of the RPM of the motor.

15 Claims, 6 Drawing Sheets

(56) References Cited

U.S. PATENT DOCUMENTS

2016/0161897 A1\* 6/2016 Kim .................... G03G 15/757
                                                     399/167
2017/0047877 A1\* 2/2017 Lee ....................... H02P 21/22
2018/0248450 A1\* 8/2018 van Ginkel .......... H02K 11/215

\* cited by examiner $$T_{Hall\_update} = T_{Hall} - T_{Hall\_old}$$

MOTOR CONTROL METHOD AND SYSTEM

CROSS REFERENCE TO RELATED APPLICATION

The present application claims priority to Korean Patent Application No. 10-2017-0175647, filed Dec. 20, 2017, the entire contents of which is incorporated herein for all purposes by this reference.

BACKGROUND

1. Technical Field

The present disclosure relates to a motor control method and system, and more particularly, to a motor control method and system that remove noise generated in a hall sensor for measuring a position of a motor rotor.

2. Description of the Related Art

In general, to control a three-phase brushless motor of motor-driven power steering, a position of a motor rotor needs to be calculated accurately. A motor stator uses a magnetic field formed by current flowing in a three-phase coil and a rotor uses a permanent magnet formed by repeatedly arranging N and S poles. To allow a motor to continuously revolve, a continuous revolving magnetic field of the motor needs to be formed and, to form a continuous revolving magnetic field of the motor, current flowing in a coil of each phase of an armature needs to be rectified at an appropriate time point. In this regard, a position of a rotor need to be recognized accurately for appropriate rectification. In particular, rectification may refer to change of a current direction of a motor stator coil to allow a rotor to revolve.

To drive this conventional motor, a position of a rotor and a conversion time point of phase current need to be accurately matched and, accordingly, a device for detection of a position of a rotor is required. Generally, a hall sensor is installed on each phase of the stator to detect the position of the rotor. The hall sensor has a potential difference that is changed along with change in a magnetic flux. Alternately, a current transformer (CT) may be installed on each phase of the stator. However, even when a hall sensor or a CT is used, noise is still generated due to friction, etc. between devices thus decreasing the accuracy of motor control. Accordingly, various control method and devices have been developed. An apparatus of the related art removes noise to enhance the reliability of basic information for deriving revolution per minute (RPM) and revolution amount of a motor.

However, in the related art, when a noise signal is instantly introduced to a hall sensor for transmitting and receiving only a digital signal, a normal signal and a noise signal are not capable of being distinguished. Accordingly, speed instability may occur due to an incorrect speed and position calculation or motor current control may not be appropriate to generate overcurrent. A hall sensor signal is a digital signal for outputting a signal of 0 or 1 and, thus, it is difficult to determine whether a sensor is abnormal (e.g., fails or malfunctions) using only a sensor output signal. Even when a noise signal is introduced during motor driving, it may be difficult to distinguish a normal signal and a noise signal. As motor application in a vehicle is increasing, the importance of a noise filtering function of a hall sensor signal is gradually increased to stably control a motor.

Conventionally, a signal filter of a hall sensor (e.g., position sensor) signal is designed based on an estimated value of a RPM of a motor. However, in the conventionally used speed estimation based on counter electromotive force, since noise is contained in sensed three-phase current and three-phase output values at low speed, reliability is degraded and, accordingly, a low speed filter band needs to be set. Since a filter band is set in consideration of an error between estimated speed calculated via a model and actual speed, a filtering effect is degraded as much as the error and, accordingly, an error is increased at higher speed.

The contents described as the related art have been provided merely to assist in understanding the background of the present disclosure and should not be considered as corresponding to the related art known to those having ordinary skill in the art.

SUMMARY

An object of the present disclosure is to provide a motor control method and system that effectively control noise generated from a hall sensor of a motor to enhance the accuracy and efficiency of speed or position control of the motor.

According to an embodiment of the present disclosure, a motor control method includes calculating a measured value of a revolution per minute (RPM) of a motor based on a signal measured by a hall sensor installed in the motor, applying a motor system load model to calculate a predicted value of the RPM of the motor, and detecting noise of a hall sensor signal using the measured value of the RPM of the motor and the predicted value of the RPM of the motor.

The motor control method may further include prior to the calculating of the measured value of the RPM of the motor, detecting change in a signal measured by the hall sensor, wherein the calculating of the measured value of the RPM of the motor may include measuring a period at which the detected signal is changed and calculating the measured value of the RPM of the motor using the period at which the signal is changed. The calculating of the measured value of the RPM of the motor may include calculating the measured value of the RPM of the motor according to the following equation:

$$\omega_m = \frac{1}{N \times T_{Hall\_update}}$$

where $\omega_m$ is a measured motor RPM value, $T_{Hall\_update}$ is a period at which a hall sensor signal is changed, and N is the number of poles of the motor.

The calculating of the predicted value of the RPM of the motor may include calculating the predicted value of the RPM of the motor using a relational formula between torque and load of the motor. The motor may be installed in a hydraulic system or air system and, according to a relational formula between torque and load of the motor, the torque of the motor may be calculated as the sum of accelerating force of the motor, frictional force of the motor, and load due to flow/pressure of the hydraulic system or air system, as in the following equation:

$$Tq = J\ddot{\theta} + B\dot{\theta} + K_2\dot{\theta}^2$$

where $T_q$ is motor torque, J is revolution inertia moment of a motor system, B is a friction coefficient of revolution of motor system, $K_2$ is a pipe resistance coefficient, $\ddot{\theta}$ is motor rotatory acceleration, and $\dot{\theta}$ is motor RPM.

The torque of the motor may be calculated using a q-axis current value of a synchronous coordinates system. In the detecting of noise of the hall sensor signal, when an error size between the calculated measured motor RPM value and the calculated predicted motor RPM value is greater than a predetermined reference error, the signal measured by the hall sensor may be detected as noise.

The predetermined reference error may be calculated by multiplying the error size between the calculated predicted speed value and a just previous measured motor RPM value calculated based on the hall sensor signal that is not detected as noise, with a factor. The method may further include, after the detecting of noise of the hall sensor signal, controlling torque or speed of the motor using a current RPM of the motor. A plurality of hall sensors may be installed in the motor, and the current RPM of the motor in the controlling of the torque or speed of the motor may use a measured motor RPM value measured by the hall sensor, a measured signal of which is not detected as noise, among a plurality of hall sensors. A plurality of hall sensors may be installed in the motor, and when all hall sensor signals are detected as noise in the detecting of noise of the hall sensor signal, the controlling of the torque or speed of the motor may use a predicted motor RPM value as a current motor RPM.

The motor control method may further include, after the detecting of noise of the hall sensor signal, counting a number of times that noise of the hall sensor signal is detected in the detecting of noise of the hall sensor signal and determining the hall sensor to malfunction when the counted number of times that noise of the hall sensor signal is detected is equal to or greater than a predetermined reference number of times. A plurality of hall sensors may install in the motor, the motor control method may further include, after the determining of a malfunction of the hall sensor, controlling the torque or speed of the motor, and a current RPM of the motor in the controlling of the torque or speed of the motor may use a measured motor RPM value measured by a hall sensor determined not to malfunction among a plurality of hall sensors.

The determining of the malfunction of the hall sensor includes reducing the counted number of times that noise of the hall sensor signal is detected when a signal measured by the hall sensor is not detected as noise. The determining of the malfunction of the hall sensor may include counting a number of times that a signal measured by the hall sensor is not continuously detected as noise in the detecting of noise of the hall sensor signal and resetting the number of times that noise of the hall sensor signal is detected to 0 when the counted number of times that noise is not continuously detected is greater than a predetermined continuous number of times.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
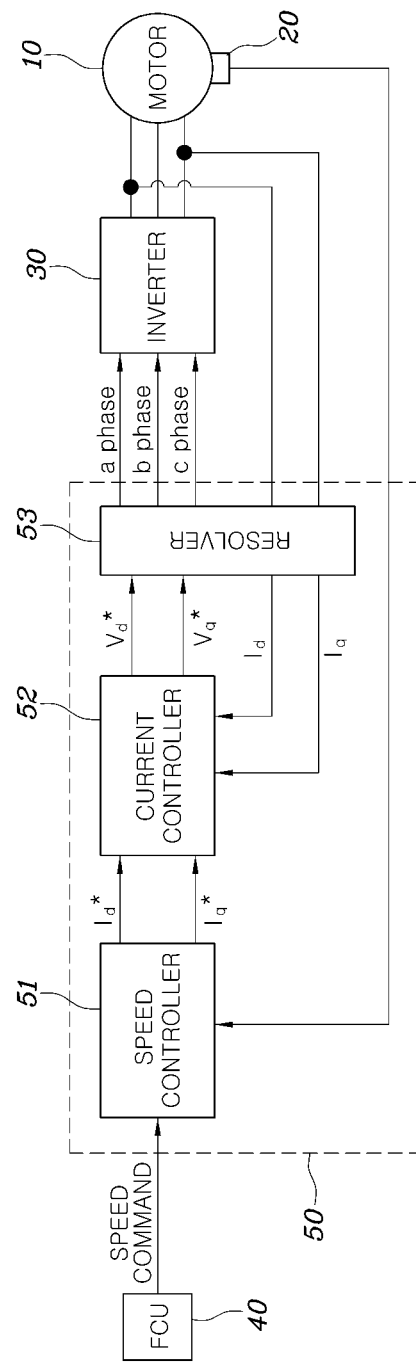
FIG. 1 is a diagram showing a configuration of a motor control system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Particular structural and functional descriptions of exemplary embodiments of the present disclosure disclosed in the specification are only for the purpose of describing particular exemplary embodiments. The exemplary embodiments of the present disclosure are formed in many different forms and should not be construed as being limited to the embodiments set forth herein.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be described in detail by explaining exemplary embodiments of the disclosure with reference to the attached drawings. Like reference numerals in the drawings denote like elements.

A motor according to the present disclosure may include a permanent magnet and speed, torque, or the like of the motor may be adjusted by an inverter. In particular, the motor according to the present disclosure may be used in an air blower configured to supply air to a fuel cell system. The permanent magnet motor may include a hall sensor configured to measure a position and speed of a rotor that includes a permanent magnet therein and revolves. An expensive driven-motor uses a resolver sensor with high accuracy but a motor used in a general pump, compressor, or blower includes an inexpensive hall sensor installed therein.

In general, a signal of a hall sensor installed in a motor is a digital signal of 0 or 1 and, thus, it is difficult to determine noise. Information is not provided regarding an existing speed value while a motor is driven in a steady state and, thus, it is difficult to filter noise in a sensed hall sensor signal. A driving condition of a motor in a steady state corresponds to a time point in which a three-phase switching device is suddenly switched on to supply current to three phases of the motor from a state in which current is not supplied to the three phases of the motor and, accordingly, noise of electromagnetic waves is increased to generate substantial noise in a hall sensor signal. In addition, as maximum revolution per minute (RPM) of a motor is increased, a frequency of a hall sensor signal is also increased and, accordingly, it may difficult to determine noise using only a frequency amplitude.

A time point when a hall sensor signal is changed may include an increasing edge at which the signal is changed to 1 from 0 and a decreasing edge at which the signal is changed to 0 from 1. A digital signal receiver that receives the hall sensor signal may be configured to generate interrupt for more accurately notifying a central processing unit (CPU) of a time point when the hall sensor signal is changed at the time point. The CPU may be configured to receive absolute time information (calculation time) through a clock. A recent high-performance microcomputer (MCU) may be configured in such a way that a CPU for performing various logic calculations, a signal processor, Clock, etc. are physically configured as one component. In general, a hall sensor signal has three phase of U, V, and W at an electrical interval of 120 degrees in a general motor but, in some cases, may be configured with various ways such as a single phase, two phases, and four phases.

FIG. 1 is a diagram showing a configuration of a motor control system according to an exemplary embodiment of the present disclosure. Referring to FIG. 1, in the motor control system according to an exemplary embodiment of the present disclosure, a motor 10 may be operated by an inverter 30 and the inverter 30 may be operated by an inverter controller 50. The inverter controller 50 may be configured to receive a speed command from a fuel cell controller (FCU) 40 and may be a higher or overall controller. In addition, the inverter controller 50 may be configured to generate a command for three-phase current to the inverter 30 and the inverter 30 may thus be configured to supply three-phase current to the motor 10 based on a three-phase current command.

The motor 10 may include a hall sensor 20 installed therein and the hall sensor 20 may be configured to measure a position, speed, etc. of a motor rotor. The measured signal of the hall sensor 20 may be used for feedback-control in a speed controller 51 in the inverter controller 50. In particular, a current controller 52 in the inverter controller 50 may be configured to receive a target current value $I_d^*$ and $I_q^*$ of a synchronous coordinates system from the speed controller 51 and transmit a target voltage value $V_d^*$ and $V_q^*$ of a synchronous coordinates system to a resolver 53. The resolver 53 may be configured to convert the target voltage value of the synchronous coordinates system to a target three-phase voltage value "a" phase, "b" phase, and "c" phase and provide the target three-phase voltage value to the inverter 30. The inverter 30 may be configured to supply three-phase current to the motor 10 through a pulse width modulation (PWM) output duty of a three-phase switching circuit based on the received target three-phase voltage value "a" phase, "b" phase, and "c" phase.

In particular, in the case of a synchronous motor of a surface mounted permanent magnet, driving current supplied to the motor 10 from the inverter 30 may be three-phase current and may be proportional to q-axis current $I_q$ of the synchronous coordinates system. The d-axis current $I_d$ of the synchronous coordinates system may be 0 [A]. The current controller 52 may be configured to supply a control value to the inverter 30 to cause a measured value of driving current supplied to the motor 10 to reach a target value. A current sensor (not shown) configured to measure driving current supplied to the motor 10 from the inverter 30 may be disposed between the inverter 30 and the motor 10. A sensor (not shown) may be configured to measure two currents among three-phase driving currents and feed back to the current controller 52 through the resolver 53. The current controller 52 may then be configured to perform feedback-control to cause a measured value $I_d$ and $I_q$ of an actually driving current to correspond to a target current value $I_d^*$ and $I_q^*$ input from the speed controller 51. A current sensor (not shown) configured to sense three-phase current supplied to the motor 10 may generally be configured to sense two-phase current among three-phase currents and, in some cases, a current sensor (not shown) may be installed in all of one phase or three phases.

Figure 2:
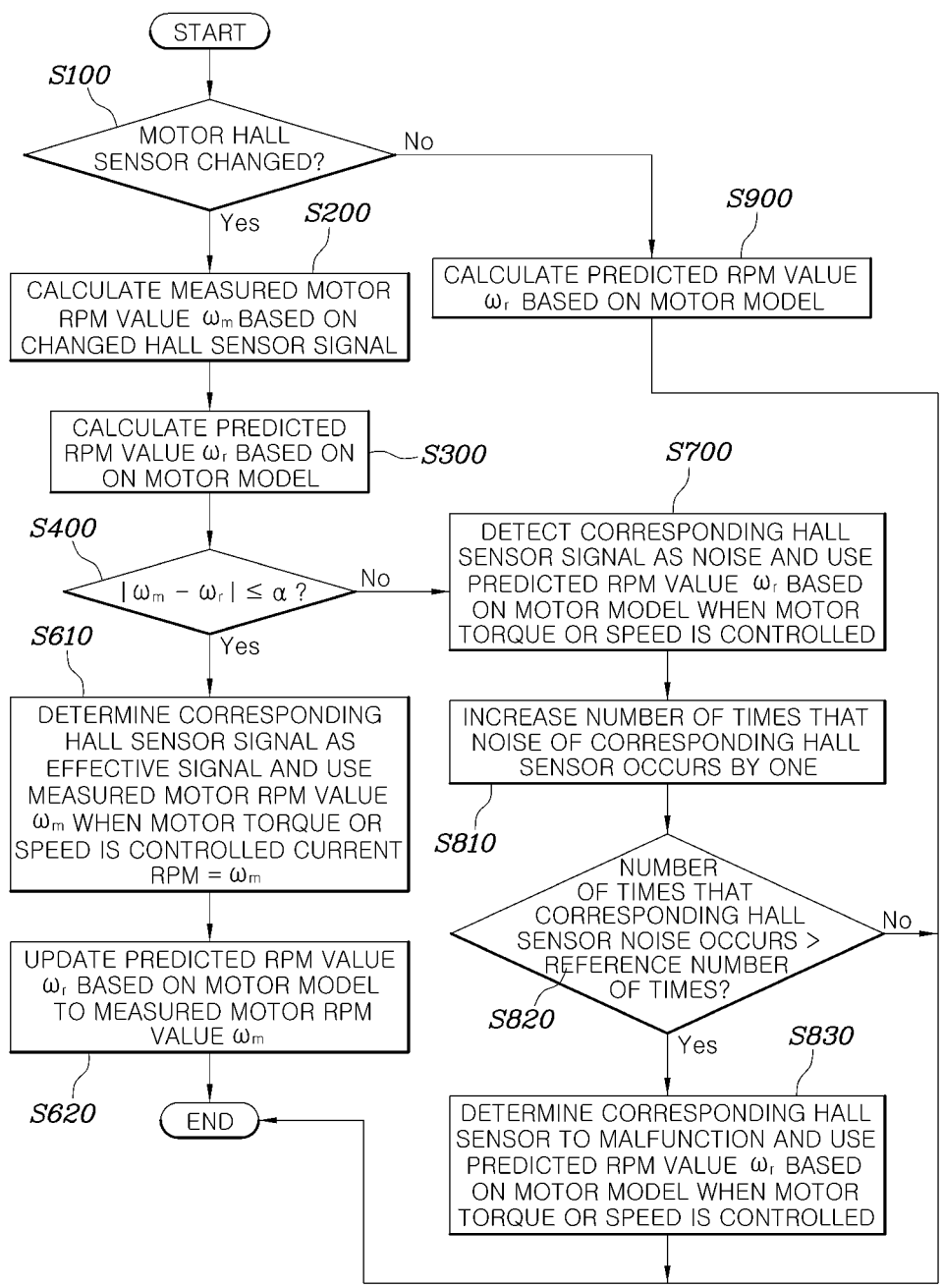
FIG. 2 is a flowchart of a motor control method according to an exemplary embodiment of the present disclosure.

FIG. 2 is a flowchart of a motor control method according to an exemplary embodiment of the present disclosure. The method described herein below may be executed by an overall controller. Referring to FIG. 2, the motor control method according to an exemplary embodiment of the present disclosure may include calculating a measured value of a revolutions per minute (RPM) of a motor based on a signal measured by a hall sensor installed in the motor (S200), applying a motor system load model to calculate a predicted value of the RPM of the motor (S300), and detecting noise of a hall sensor signal using the measured value of the RPM of the motor and the predicted value of the RPM of the motor (S400).

The motor control method may further include detecting change in a signal measured by the hall sensor (S100) prior to the calculating of the measured value of the RPM of the motor (S200). The calculating of the measured value of the RPM of the motor (S200) may include measuring a period at which the detected signal is changed and calculating the measured value of the RPM of the motor using the period at which the signal is changed.

The detecting of the change in a signal measured by the hall sensor (S100) may include determining whether a signal measured by the hall sensor of the motor is changed and, when the signal measured by the hall sensor is changed, the calculating of the measured value of the RPM of the motor (S200) may be performed. In particular, change in the signal measured by the hall sensor may correspond to an increasing edge at which the signal is changed to 1 from 0 or a decreasing edge at which the signal is changed to 0 from 1. When the signal measured by the hall sensor remains the same (e.g., no changed), the predicted value of the RPM of the motor may be calculated (S900) and the control may be terminated.

Figure 5:
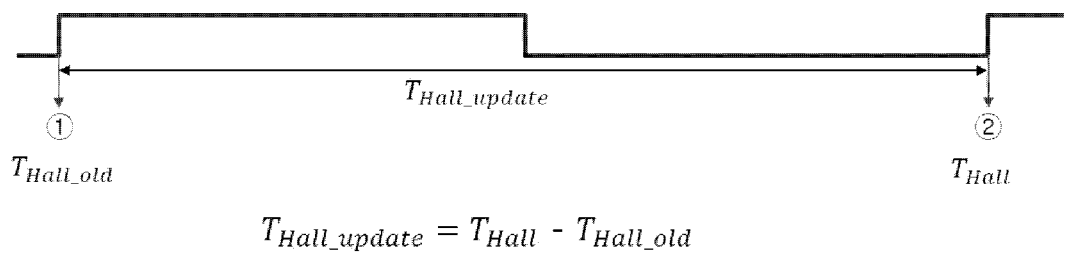
FIG. 5 is a diagram showing detection of change in a hall sensor signal according to an exemplary embodiment of the present disclosure.

The change in the signal measured by the hall sensor may be detected based on whether all signals of the hall sensor of each of U, V, and W phases are changed and a measured RPM value $\omega_m$ of the motor may be calculated using a time point when the hall sensor signal is changed. In particular, in the calculating of the measured value of the RPM of a motor (S200), the measured RPM value $\omega_m$ of the motor may be calculated using the following equation.

$$\omega_m = \frac{1}{N \times T_{Hall\_update}}$$

wherein, $\omega_m$: measured motor RPM value, $T_{Hall\_update}$: period of at which hall sensor signal is changed, N: the number of poles of motor $$T_{Hall\_update} = T_{Hall} + T_{Hall\_old} \text{ may be satisfied.}$$

wherein, $T_{Hall}$: Time point when hall sensor value is changed and $T_{Hall\_old}$: Time point when existing hall sensor value is changed FIG. 5 is a diagram showing detection of change in a hall sensor signal according to an exemplary embodiment of the present disclosure. In particular, referring to FIG. 5, a time period to a next increasing edge ($T_{Hall}$, ②) from a previous rising edge ($T_{Hall\_old}$, ①) may be calculated as a hall sensor signal changing period ($T_{Hall\_update}$) and calculated at a period of one electrical revolution.

With regard to three-phase (U, V, and W) hall sensor signals, an electrical RPM of a motor while the motor electrically revolves once may be calculated 6 times with respect to each hall sensor based on time (period) information to a next increasing edge from an increasing edge and to a next decreasing edge from a decreasing edge. With regard to three-phase (U, V, and W) hall sensor signals, an electrical RPM of a motor while the motor electrically revolves once may be calculated 6 times at each of an increasing edge and a decreasing edge using the above method. The electrical RPM of the motor may be the same as an RPM of the motor but the RPM of the motor may be N times the electrical RPM of the motor according to the number of poles of the motor.

According to another exemplary embodiment of the present disclosure, a time period to a next decreasing edge from an increasing edge may be calculated as a hall sensor signal changing period ($T_{Hall\_update}$) and two times of the hall sensor signal changing period ($T_{Hall\_update}$) may be calculated as a period of one electrical revolution.

Figure 6:
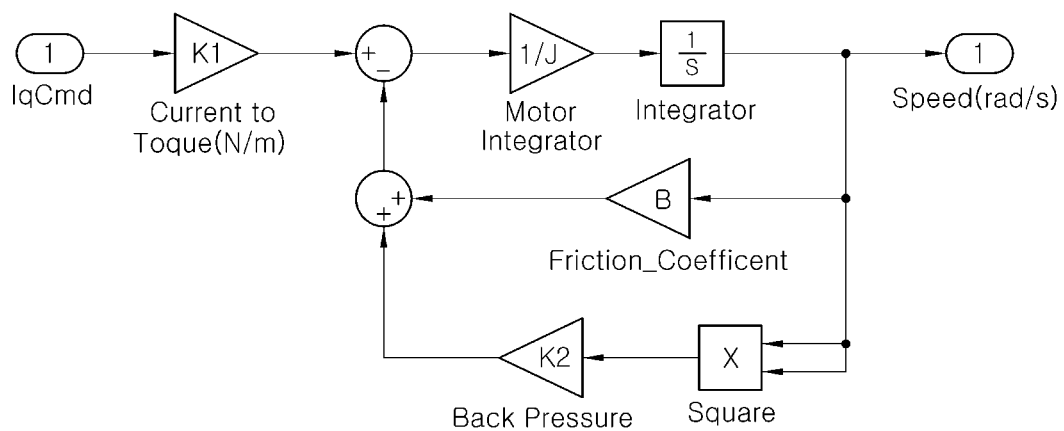
FIG. 6 is a diagram showing a structure of a motor and a hydraulic system or air system model according to an exemplary embodiment of the present disclosure.

FIG. 6 is a diagram showing a structure of a motor and a hydraulic system or air system model according to an exemplary embodiment of the present disclosure. Referring to FIG. 6, in the calculating of the predicted value of the RPM of the motor (S300), the predicted value of the RPM of the motor may be calculated using a relational formula between torque and load of the motor. The motor according to the present disclosure may be installed in a hydraulic system or air system and, in particular, according to a relational formula between torque and load of the motor installed in the hydraulic system or air system, the torque of the motor may be calculated as the sum of accelerating force of the motor, frictional force of the motor, and load due to flow/pressure of the hydraulic system or air system, as in the following equation.

$$Tq = J\ddot{\theta} + B\dot{\theta} + K_2\dot{\theta}^2$$

wherein, $T_q$: Motor torque, J: revolution inertia moment of motor system, B: friction coefficient of revolution of motor system, $K_2$: pipe resistance coefficient, $\ddot{\theta}$: motor rotatory acceleration, $\dot{\theta}$: motor RPM The motor torque may be calculated using a q-axis current value of the synchronous coordinates system.

$$T_q = K_1 * I_q$$

wherein, $T_q$: Motor torque, $K_1$: motor torque proportional factor, $I_q$: q-axis current value of synchronous coordinates system $$K_1 = \frac{3}{2} * \frac{N}{2} * \emptyset_f$$

wherein, motor torque proportional factor, N: the number of motor poles, $\emptyset_f$: magnetic flux of permanent magnet The q-axis current value $I_q$ of the synchronous coordinates system may be calculated by measuring current supplied to a motor from an inverter through a sensor (not shown) or the like or calculated using a current command value IqCmd provided to a current controller from a speed controller in a normal control situation (control without malfunction). $K_1$ may be a transmutation constant for converting a current command value to a torque value, J may be a revolution inertia moment of a motor system, B may be a revolution coefficient of the motor as described in the above equation, and $K_2$ may be a pipe resistance coefficient. Accordingly, as shown in FIG. 2 showing the structure of the motor and the hydro or aero system model, the motor RPM $\dot{\theta}$ may be estimated. The estimated motor RPM $\dot{\theta}$ may be calculated as a predicted motor RPM value $\omega_r$.

However, when speed is continuously calculated using a relational formula between torque and load of the motor, errors are present in the actual speed and steady state based on model accuracy and, accordingly, a predicted current speed value $\omega_r$ may be calculated through a motor system model based on q-axis current torque of a synchronous coordinates system, which is supplied to the motor at a control period based on a speed value $\omega_{m\_old}$ calculated at a time point when a just previous effective hall sensor signal is changed. Torque applied to the motor at a control period is changed and, thus, the predicted RPM value $\omega_r$ may be calculated based on a model at a control period to more accurately calculate a predicted speed value based on the model.

In the detecting of noise of the hall sensor signal (S400), noise of the hall sensor signal may be detected using an error size between the calculated measured motor RPM value $\omega_m$ and the calculated predicted motor RPM value $\omega_r$. In particular, when the error size between the calculated measured motor RPM value $\omega_m$ and the calculated predicted motor RPM value $\omega_r$ is greater than a predetermined reference error $\alpha$, a signal measured in a hall sensor may be detected as noise. Additionally, when the error size between the calculated measured motor RPM value $\omega_m$ and the calculated predicted motor RPM value $\omega_r$ is equal to or less than the predetermined reference error $\alpha$, the signal measured in the hall sensor may be detected as an effective signal but not noise.

The predetermined reference error $\alpha$ may be calculated by multiplying the error size between the calculated predicted motor RPM value $\omega_r$ and the previous measured motor RPM value $\omega_{m\_old}$ calculated based on the hall sensor signal that is not detected as noise, with a factor. The factor may be set in consideration of stability or, in general, may be set to 1 or more or 2 or less. To prevent erroneous detection of a malfunction, the factor may be set to be large or, to sensitively detect noise of a hall sensor signal, the factor may be set to be smaller. In other words, the factor may be increased to thus prevent erroneous detection of a malfunction.

When a hall sensor signal is determined to be effective, the predicted motor RPM value $\omega_r$ based on a motor model may be updated as the RPM value $\omega_m$ calculated based on the corresponding hall sensor signal determined to be effective to remove a steady state error (S610). The predicted motor RPM value $\omega_r$ based on the motor model may be updated as the actually measured value $\omega_m$ and, accordingly, as an error in a model may not continuously accumulate and synchronization is performed every time point when a hall sensor is effectively changed, an error may accumulate only after a time point when synchronization is performed, thereby minimizing a steady state error between predicted model speed and actual speed.

The motor control method may further include, after detecting noise of the hall sensor signal (S400), adjusting torque or speed of a motor using a current RPM of the motor (S610 and S700). When the signal measured in the hall sensor is not detected as noise in the detecting of noise of the hall sensor signal (S400), the current RPM of the motor may be used as the measured motor RPM value $\omega_m$ in the adjusting of the torque or speed of the motor (S610).

However, when the signal measured in the hall sensor is detected as noise, the current RPM of the motor may not be used as the measured motor RPM value $\omega_m$ in the adjusting of the torque or speed of the motor (S700). In particular, a hall sensor configured to measure each of U, V, and W phases may be provided and a plurality of hall sensors may be installed in the motor. Accordingly, the current RPM of the motor in the adjusting of the torque or speed of the motor (S700) may be used as the measured motor RPM value $\omega_m$ measured by a hall sensor, a measured signal of which is not detected as noise, among a plurality of hall sensors. However, when all hall sensor signals are detected as noise, the adjusting of the torque or speed of the motor (S700) may use the predicted motor RPM value $\omega_r$ as the current motor RPM.

The motor control method may further include, after the detecting of noise of the hall sensor signal (S400), counting a number of times that noise of the hall sensor signal is detected (S810), and detecting a malfunction of the hall sensor when the counted number of times that noise of the hall sensor signal is detected is equal to or greater than a predetermined reference number of times (S820). The number of times that noise of the hall sensor signal is detected may be independently counted with respect to each of U, V, and W phases. The predetermined reference number of times may be set to an appropriate number of times in consideration of sensitivity, etc. of noise detection. Accordingly, a malfunction of the hall sensor for measuring U, V, and W phases may each be determined.

The motor control method may further include, after determining a malfunction of the hall sensor (S820), adjusting torque or speed of the motor (S830). When the hall sensor is determined to malfunction, a measured motor RPM value measured by the hall sensor determined not to malfunction among a plurality of hall sensors may be used as a current motor RPM in the adjusting of the torque or speed of the motor (S830).

When all hall sensors are determined to malfunction, the predicted motor RPM value $\omega_r$ may be used. In other words, when the counted number of times that noise of the hall sensor signal is detected is equal to or greater than the predetermined reference number, the hall sensor may be determined to malfunction and, when the hall sensor is determined to be malfunction, a signal of the hall sensor is determined to be unreliable and, thus, the measured motor RPM value $\omega_m$ may not be used as a current motor RPM in the adjusting of torque or speed of the motor.

Figure 3:
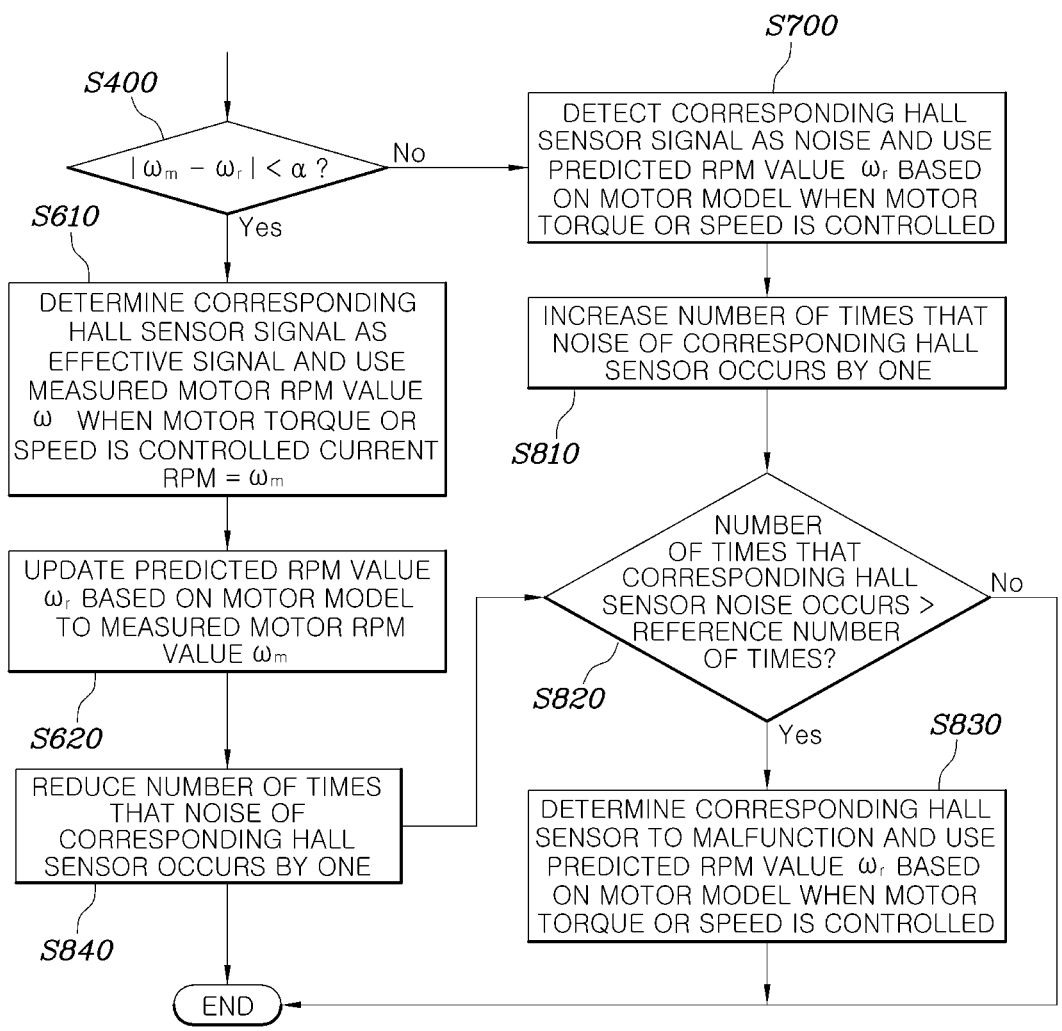
FIG. 3 is a diagram showing only a modified portion of FIG. 2 according to another exemplary embodiment of the present disclosure.

FIG. 3 is a diagram showing only a modified portion of FIG. 2 according to another exemplary embodiment of the present disclosure. Referring to FIG. 3, according to another exemplary embodiment of the present disclosure, in the determining of a malfunction of a hall sensor (S820), when noise is not detected in a signal measured by the hall sensor, the counted number of times that the hall sensor signal is detected may be reduced (S840).

In other words, when noise is not detected, the number of times that noise of the hall sensor signal is detected may be counted as being decreased (S840). The other control is the same as in the control method of FIG. 2 and a description thereof is omitted here. Accordingly, a problem in which a corresponding hall sensor is determined to malfunction when noise is temporarily generated due to temporary disturbance or disconnection of a signal line may be overcome and the accuracy of determining a malfunction of the hall sensor may be enhanced.

Figure 4:
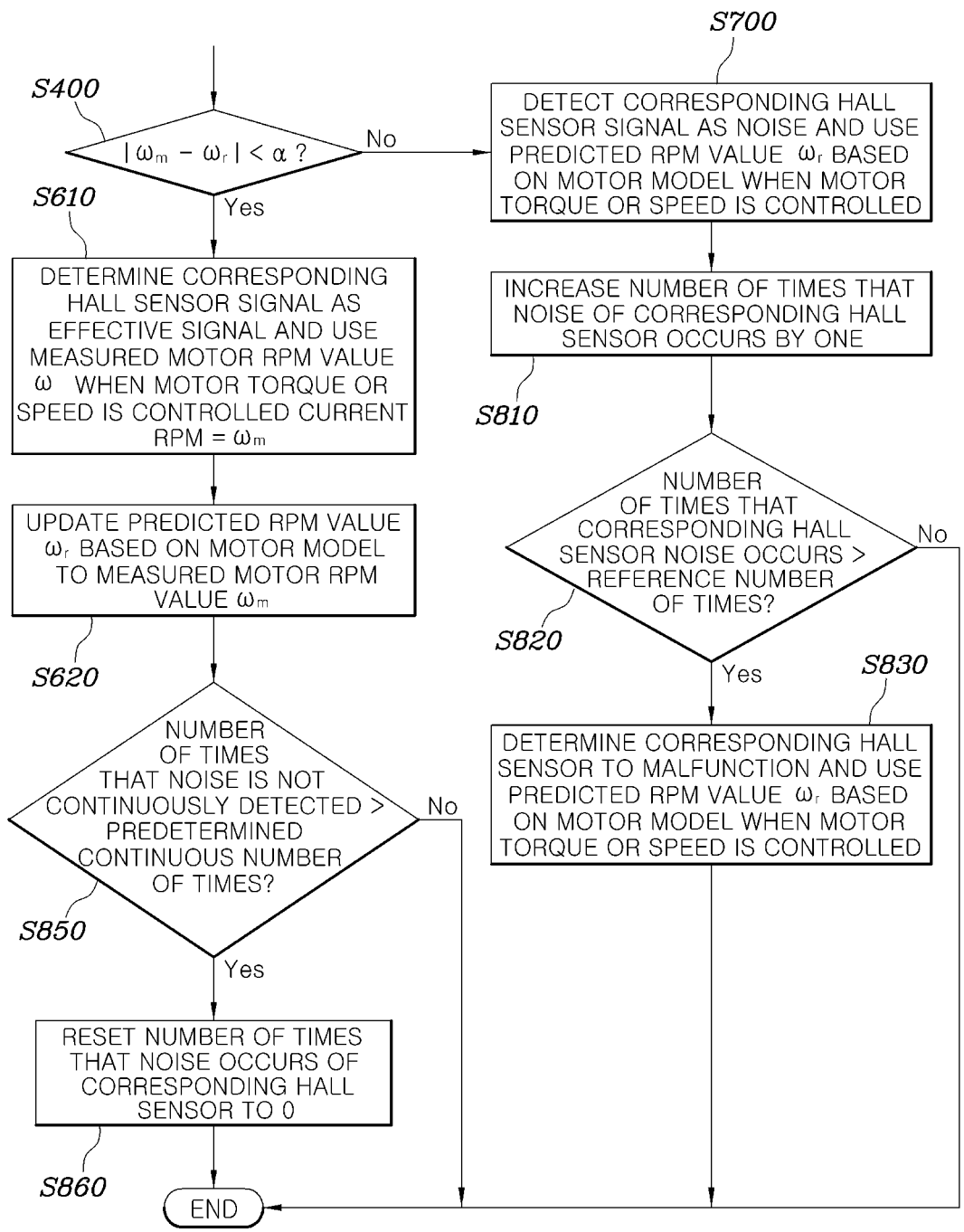
FIG. 4 is a diagram showing only a modified portion of FIG. 2 according to another exemplary embodiment of the present disclosure.

FIG. 4 is a diagram showing only a modified portion of FIG. 2 according to another exemplary embodiment of the present disclosure. Referring to FIG. 4, according to another exemplary embodiment of the present disclosure, in the determining of a malfunction of a hall sensor (S820), the number of times that noise is not continuously detected in a signal measured by a hall sensor may be counted (S630) and, when the counted number of times that noise is not continuously detected is greater than a predetermined continuous number of times (S850), the number of times that noise is detected in the hall sensor signal may be reset to 0 (S860).

In other words, when the number of times that noise is not continuously detected is greater than the predetermined continuous number of times, it may be determined to temporarily generate noise and then to restore to a normal state and the currently counted number of times that noise is detected in the hall sensor signal may be initialized to 0 (S860). The other control is the same as in the control method of FIG. 2 and a description thereof is omitted here.

The predetermined continuous number of times may be set to an appropriate number of times in consideration of a sensitivity degree, etc. of noise. The number of times that noise is not continuously detected may also be initialized to 0 when noise is detected while counting the number of times. Accordingly, robustness of determining a malfunction of a hall sensor due to noise of the hall sensor may be ensured and the accuracy of determining a malfunction of the hall sensor may be enhanced.

Figure 7A:
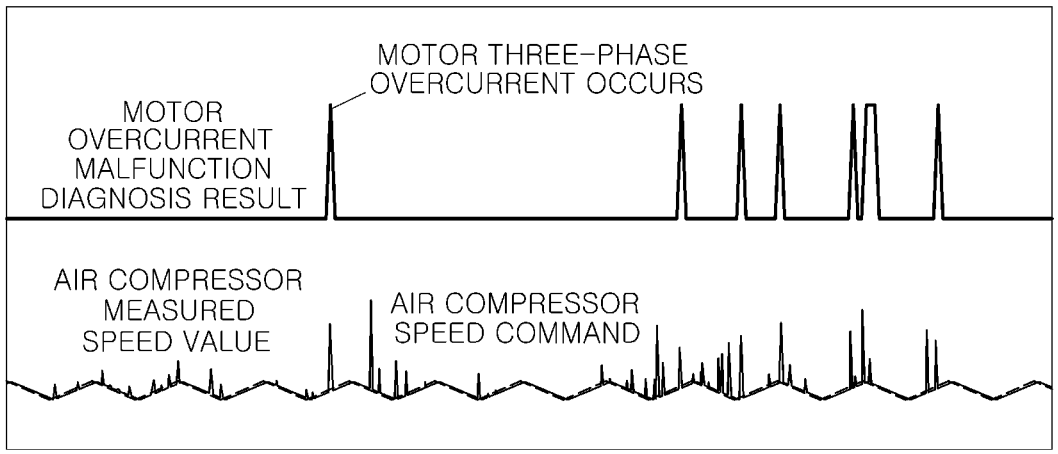
FIGS. 7A-7B are graphs showing effect comparison between a conventional motor control method and a motor control method according to an exemplary embodiment of the present disclosure.
Figure 7B:
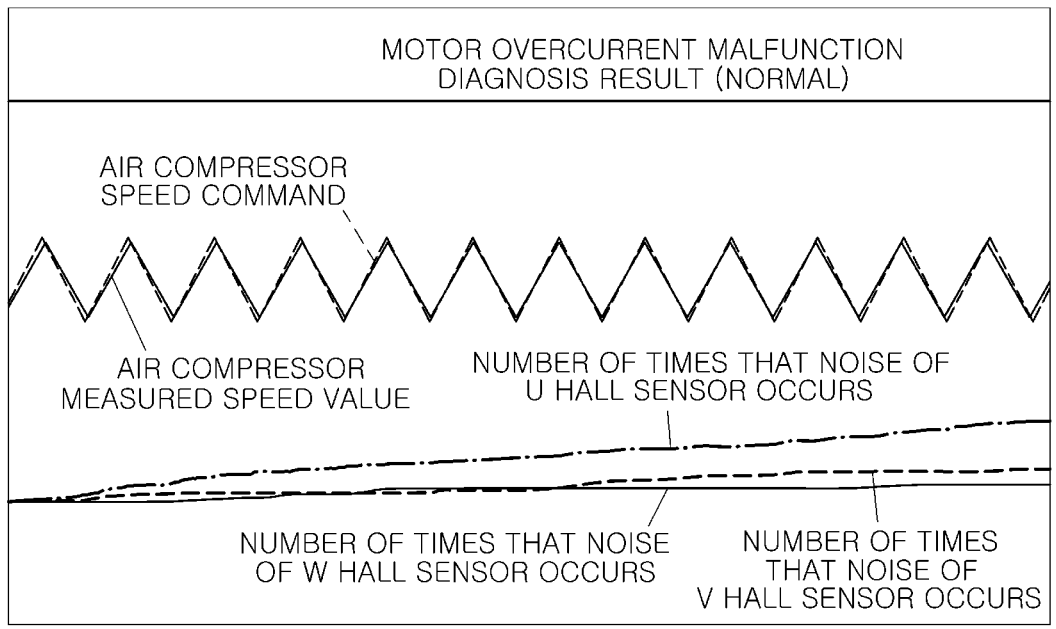

FIGS. 7A-7B are graphs showing effect comparison between a conventional motor control method and a motor control method according to an exemplary embodiment of the present disclosure. Referring to FIG. 7, FIG. 7A shows a result when a motor control method according to the present disclosure is not applied and FIG. 7B shows a result when the motor control method according to the present disclosure is applied.

A test condition corresponds to repetitive driving of a motor used in an air compressor at 15 krpm to 40 krpm in the form of a RAMP function at a period of one second and, to copy disconnection of a cable, a RANDOM noise signal is applied to each hall sensor signal. As the noise signal, several tens or more of hall sensor noise are introduced.

Based on the result when the motor control method according to the present disclosure is not applied in FIG. 7A, an error occurs when a position or speed of a motor rotor is recognized along with introduction of a noise signal and, accordingly, overcurrent flows in motor three-phase current occurs several times. In addition, an air compressor is operated in such a way that speed is frequently deviated from a speed command.

However, based on the result when the motor control method according to the present disclosure is applied in FIG. 7B, even when a noise signal is introduced, a problem does not occur when a position or speed of a motor rotor is recognized and, accordingly, overcurrent flows in motor three-phase current does not occur. In addition, the air compressor is operated in such a way that speed almost completely corresponds to a speed command.

Accordingly, when the motor control method according to the present disclosure is applied, even if several tens or more of hall sensor noise signal per second are introduced, a noise signal is filtered to maintain the speed or position of a motor rotor in a normal value and the occurrence number of times of a problem in which overcurrent flows in motor three-phase current is reduced.

According to the motor control method according to the present disclosure, noise of a signal measured by a hall sensor of a motor may be effectively removed from all driving speed areas to enhance motor control stability. The reliability of a hall sensor noise signal may be enhanced to reduce an error of measurement of a motor RPM through a hall sensor signal, thereby overcoming instability of control of a motor RPM. In addition, the hall sensor noise signal may be filtered to prevent overcurrent generated in three-phase current supplied to a motor.

Although the present disclosure has been shown and described with respect to specific exemplary embodiments, it will be apparent to those having ordinary skill in the art that the present disclosure may be variously modified and altered without departing from the spirit and scope of the present disclosure as defined by the following claims.

What is claimed is:

1. A motor control method, comprising:
calculating, by a controller, a measured value of a revolution per minute (RPM) of a motor based on a signal measured by a hall sensor installed in the motor;
calculating, by the controller, a predicted value of the RPM of the motor by applying a motor system load model; and
detecting, by the controller, noise of a hall sensor signal using the measured value of the RPM of the motor and the predicted value of the RPM of the motor,
wherein the motor is installed in a hydraulic system or air system,
wherein the calculating of the predicted value of the RPM of the motor includes:
calculating, by the controller, the predicted value of the RPM of the motor using a relational formula between torque and load of the motor,
wherein in the detecting of noise of the hall sensor signal, the signal measured by the hall sensor is detected as noise when an error size between the calculated measured motor RPM value and the calculated predicted motor RPM value is greater than a predetermined reference error,
wherein the predetermined reference error is calculated by multiplying the error size between the calculated predicted motor RPM value and a previous measured motor RPM value calculated based on the hall sensor signal that is not detected as noise, with a factor; and
when the noise of the hall sensor signal is detected, adjusting, by the controller, torque or speed of the motor using a current RPM of the motor.

2. The motor control method of claim 1, further comprising:
prior to the calculating of the measured value of the RPM of the motor, detecting, by the controller, change in a signal measured by the hall sensor,
wherein the calculating of the measured value of the RPM of the motor includes measuring a period at which the detected signal is changed and calculating the measured value of the RPM of the motor using the period at which the signal is changed.

3. The motor control method of claim 2, wherein the calculating of the measured value of the RPM of the motor includes calculating the measured value of the RPM of the motor according to the following equation:

$$\omega_m = \frac{1}{N \times T_{Hall\_update}}$$

wherein $\omega_m$ is a measured motor RPM value, $T_{Hall\_update}$ is a period at which a hall sensor signal is changed, and N is the number of poles of the motor.

4. The motor control method of claim 1, wherein according to the relational formula between torque and load of the motor, the torque of the motor is calculated as the sum of accelerating force of the motor, frictional force of the motor, and load due to flow/pressure of the hydraulic system or air system, as in the following equation:

$$Tq = J\ddot{\theta} + B\dot{\theta} + K_2\dot{\theta}^2$$

wherein $T_q$ is motor torque, J is revolution inertia moment of a motor system, B is a friction coefficient of revolution of motor system, $K_2$ is a pipe resistance coefficient, $\ddot{\theta}$ is motor rotatory acceleration, and $\dot{\theta}$ is motor RPM.

5. The motor control method of claim 1, wherein the torque of the motor is calculated using a q-axis current value of a synchronous coordinates system.

6. The motor control method of claim 1, wherein a plurality of hall sensors are installed in the motor; and wherein the current RPM of the motor in the adjusting torque or speed of the motor is the measured value by one of the hall sensors, in which the signal is not detected as noise, among the plurality of hall sensors.

7. The motor control method of claim 1, wherein a plurality of hall sensors are installed in the motor; and wherein, when all hall sensor signals are detected as noise in the detecting of noise of the hall sensor signal, the adjusting of the torque or speed of the motor uses a predicted motor RPM value as a current motor RPM.

8. The motor control method of claim 1, further comprising:
after the detecting of noise of the hall sensor signal, counting, by the controller, a number of times that noise of the hall sensor signal is detected in the detecting of noise of the hall sensor signal; and
determining, by the controller, the hall sensor to malfunction when the counted number of times that noise of the hall sensor signal is detected is equal to or greater than a predetermined reference number of times.

9. The motor control method of claim 8, further comprising:
after the determining of a malfunction of the hall sensor, adjusting, by the controller, the torque or speed of the motor using a current RPM of the motor;
wherein the current RPM of the motor in the adjusting torque or speed of the motor is the measured value by the hall sensor, in which the signal is not detected as noise, among a plurality of hall sensors installed in the motor.

10. The motor control method of claim 8, wherein the determining of the malfunction of the hall sensor includes:
reducing, by the controller, the counted number of times that noise of the hall sensor signal is detected when a signal measured by the hall sensor is not detected as noise.

11. The motor control method of claim 8, wherein the determining of the malfunction of the hall sensor includes:
counting, by the controller, a number of times that a signal measured by the hall sensor is not continuously detected as noise in the detecting of noise of the hall sensor signal; and
resetting, by the controller, the number of times that noise of the hall sensor signal is detected to 0 when the counted number of times that noise is not continuously detected is greater than a predetermined continuous number of times.

12. The motor control method of claim 1, wherein the detecting of noise of the hall sensor signal includes:
updating, by the controller, a predicted motor RPM value based on a motor model to a speed value calculated based on an effective hall sensor signal when the hall sensor signal is determined as an effective signal.

13. A motor control system, comprising:
a memory configured to store program instructions; and
a processor configured to execute the program instructions, the program instructions when executed configured to:
calculate a measured value of a revolution per minute (RPM) of a motor based on a signal measured by a hall sensor installed in the motor;
calculate a predicted value of the RPM of the motor by applying a motor system load model; and
detect noise of a hall sensor signal using the measured value of the RPM of the motor and the predicted value of the RPM of the motor,
wherein the motor is installed in a hydraulic system or air system,
wherein the processor is configured to calculate the predicted value of the RPM of the motor using a relational formula between torque and load of the motor,
wherein in the detecting of noise of the hall sensor signal, the signal measured by the hall sensor is detected as noise when an error size between the calculated measured motor RPM value and the calculated predicted motor RPM value is greater than a predetermined reference error,
wherein the predetermined reference error is calculated by multiplying the error size between the calculated predicted motor RPM value and a previous measured motor RPM value calculated based on the hall sensor signal that is not detected as noise, with a factor; and
when the noise of the hall sensor signal is detected, adjusting, by the controller, torque or speed of the motor using a current RPM of the motor.

14. The motor control system of claim 13, wherein the program instructions when executed are further configured to:
prior to the calculating of the measured value of the RPM of the motor, detect change in a signal measured by the hall sensor,
wherein the calculating of the measured value of the RPM of the motor includes measuring a period at which the detected signal is changed and calculating the measured value of the RPM of the motor using the period at which the signal is changed.

15. The motor control system of claim 14, wherein the calculating of the measured value of the RPM of the motor includes calculating the measured value of the RPM of the motor according to the following equation:

$$\omega_m = \frac{1}{N \times T_{Hall\_update}}$$

wherein $\omega_m$ is a measured motor RPM value, $T_{Hall\_update}$ is a period at which a hall sensor signal is changed, and N is the number of poles of the motor.

* * * * *